United States Patent
Terrel et al.

(10) Patent No.: US 12,111,207 B2
(45) Date of Patent: Oct. 8, 2024

(54) DESPECKLING IN OPTICAL MEASUREMENT SYSTEMS

(71) Applicant: Apple Inc., Cupertino, CA (US)

(72) Inventors: Matthew A Terrel, Campbell, CA (US); David S Gere, Palo Alto, CA (US); Alexander F Sugarbaker, Woodside, CA (US); Thomas C Greening, San Jose, CA (US); Jason S Pelc, Sunnyvale, CA (US); Mark A. Arbore, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/234,794

(22) Filed: Aug. 16, 2023

(65) Prior Publication Data

US 2024/0102856 A1    Mar. 28, 2024

Related U.S. Application Data

(60) Provisional application No. 63/409,538, filed on Sep. 23, 2022, provisional application No. 63/461,777, filed on Apr. 25, 2023.

(51) Int. Cl.
   *G01J 1/44* (2006.01)
(52) U.S. Cl.
   CPC ..................................... *G01J 1/44* (2013.01)
(58) Field of Classification Search
   CPC .......... G01J 1/44; G01J 2001/444; G02B 6/43
   See application file for complete search history.

(56) References Cited

U.S. PATENT DOCUMENTS

| 4,897,711 A | 1/1990 | Blonder |
| 5,037,779 A | 8/1991 | Whalley |

(Continued)

FOREIGN PATENT DOCUMENTS

| CN | 206546453 | 10/2017 |
| DE | 102004025775 | 4/2005 |

(Continued)

OTHER PUBLICATIONS

Extended European Search Report dated Jan. 24, 2024, EP 23197128.4, 9 pages.

(Continued)

*Primary Examiner* — Georgia Y Epps
*Assistant Examiner* — Don J Williams
(74) *Attorney, Agent, or Firm* — Brownstein Hyatt Farber Schreck, LLP

(57) ABSTRACT

Embodiments are directed to optical measurement systems that utilize multiple emitters to emit light during a measurement, as well as methods of performing measurements using these optical measurement systems. The optical measurement systems may include a light generation assembly that is configured to generate light via a light source unit, and a photonic integrated circuit that includes a launch group having a plurality of emitters. Each of these emitters is optically coupled to the light generation assembly to receive light generated from the light generation assembly, and may emit this light from a surface of the photonic integrated circuit. The optical measurement system may perform a measurement in which the light generation assembly generates light and each of the plurality of emitters simultaneously emit light received from the light generation assembly.

26 Claims, 8 Drawing Sheets

(56) References Cited

U.S. PATENT DOCUMENTS

| | | |
|---|---|---|
| 5,109,455 A | 4/1992 | Niswonger |
| 5,479,540 A | 12/1995 | Boudreau |
| 5,488,678 A | 1/1996 | Taneya |
| 5,577,142 A | 11/1996 | Mueller-Fiedler et al. |
| 5,604,160 A | 2/1997 | Warfield |
| 5,981,945 A | 11/1999 | Spaeth |
| 6,074,104 A | 6/2000 | Higashikawa |
| 6,228,675 B1 | 5/2001 | Ruby |
| 6,330,378 B1 | 12/2001 | Forrest |
| 6,367,988 B1 | 4/2002 | Auracher |
| 6,393,185 B1 | 5/2002 | Deacon |
| 6,461,059 B2 | 10/2002 | Ando et al. |
| 6,465,929 B1 | 10/2002 | Levitan et al. |
| 6,519,382 B1 | 2/2003 | Jurbergs |
| 6,588,949 B1 | 7/2003 | Zhou |
| 6,594,409 B2 | 7/2003 | Dutt et al. |
| 6,628,858 B1 | 9/2003 | Zhang |
| 6,632,027 B1 | 10/2003 | Yoshida |
| 6,657,723 B2 | 12/2003 | Cohen |
| 6,759,668 B2 | 7/2004 | Matsuo et al. |
| 6,767,753 B2 | 7/2004 | Huang |
| 6,786,654 B2 | 9/2004 | Kilian |
| 6,795,622 B2 | 9/2004 | Forrest |
| 6,798,931 B2 | 9/2004 | Kathman et al. |
| 6,801,679 B2 | 10/2004 | Koh |
| 6,801,683 B2 | 10/2004 | Kanie et al. |
| 6,821,032 B2 | 11/2004 | Lake et al. |
| 6,823,098 B2 | 11/2004 | Guidotti et al. |
| 6,856,717 B2 | 2/2005 | Kilian |
| 6,873,763 B2 | 3/2005 | Nikonov |
| 6,894,358 B2 | 5/2005 | Leib |
| 6,898,222 B2 | 5/2005 | Hennig et al. |
| 6,904,191 B2 | 6/2005 | Kubby |
| 6,932,519 B2 | 8/2005 | Steinberg |
| 6,935,792 B2 | 8/2005 | Saia et al. |
| 6,940,182 B2 | 9/2005 | Hilton et al. |
| 6,947,639 B2 | 9/2005 | Singh |
| 6,952,504 B2 | 10/2005 | Bi |
| 6,955,481 B2 | 10/2005 | Colgan et al. |
| 6,964,881 B2 | 11/2005 | Chua et al. |
| 6,969,204 B2 | 11/2005 | Kilian |
| 6,975,465 B1 | 12/2005 | Chung |
| 7,054,517 B2 | 5/2006 | Mossberg |
| 7,058,245 B2 | 6/2006 | Farahi |
| 7,062,114 B2 | 6/2006 | Webjorn |
| 7,071,521 B2 | 7/2006 | Leib et al. |
| 7,079,715 B2 | 7/2006 | Kish |
| 7,085,445 B2 | 8/2006 | Koh |
| 7,165,896 B2 | 1/2007 | Hauffe et al. |
| 7,203,401 B2 | 4/2007 | Mossberg |
| 7,209,611 B2 | 4/2007 | Joyner |
| 7,213,978 B2 | 5/2007 | Kuhmann |
| 7,223,619 B2 | 5/2007 | Wang |
| 7,245,379 B2 | 7/2007 | Schwabe |
| 7,283,694 B2 | 10/2007 | Welch |
| 7,315,039 B2 | 1/2008 | Kitagawa |
| 7,335,986 B1 | 2/2008 | Paek |
| 7,358,109 B2 | 4/2008 | Gallup et al. |
| 7,366,364 B2 | 4/2008 | Singh |
| 7,426,347 B2 | 9/2008 | Hnatiw et al. |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Kish et al. |
| 7,519,246 B2 | 4/2009 | Welch et al. |
| 7,576,333 B2 | 8/2009 | Modavis |
| 7,577,327 B2 | 8/2009 | Blauvelt et al. |
| 7,612,881 B2 | 11/2009 | Ban et al. |
| 7,680,364 B2 | 3/2010 | Nilsson |
| 7,720,328 B2 | 5/2010 | Yan |
| 7,750,289 B2 | 7/2010 | Feldman |
| 7,812,264 B2 | 10/2010 | Yoneda et al. |
| 7,885,492 B2 | 2/2011 | Welch |
| 7,974,504 B2 | 7/2011 | Nagarajan |
| 8,105,514 B2 | 1/2012 | Hayashi |
| 8,198,109 B2 | 6/2012 | Lerman et al. |
| 8,318,057 B2 | 11/2012 | Harden |
| 8,417,071 B2 | 4/2013 | Hopkins et al. |
| 8,474,134 B2 | 7/2013 | Yoneda et al. |
| 8,548,287 B2 | 10/2013 | Thacker et al. |
| 8,563,358 B2 | 10/2013 | Landesberger et al. |
| 8,611,388 B2 | 12/2013 | Krasulick et al. |
| 8,638,485 B2 | 1/2014 | Feng et al. |
| 8,659,813 B2 | 2/2014 | Davis et al. |
| 8,735,191 B2 | 5/2014 | Marchena |
| 8,774,569 B2 | 7/2014 | Dougherty et al. |
| 8,859,394 B2 | 10/2014 | Dallesasse et al. |
| 8,916,587 B1 | 12/2014 | King et al. |
| 8,966,748 B2 | 3/2015 | Leib |
| 9,008,139 B2 | 4/2015 | Monadgemi |
| 9,031,412 B2 | 5/2015 | Nagarajan |
| 9,041,015 B2 | 5/2015 | Lai et al. |
| 9,064,988 B2 | 5/2015 | Hsiao et al. |
| 9,091,594 B2 | 7/2015 | Furstenberg et al. |
| 9,310,248 B2 | 4/2016 | Karlsen et al. |
| 9,395,494 B2 | 7/2016 | Krishnamurthi et al. |
| 9,396,914 B2 * | 7/2016 | Steiner .................. H01J 43/20 |
| 9,405,066 B2 | 8/2016 | Mahgerefteh |
| 9,702,975 B2 * | 7/2017 | Brinkmeyer .......... G01S 7/4818 |
| 9,715,064 B1 | 7/2017 | Gambino et al. |
| 9,874,701 B2 | 1/2018 | Baets et al. |
| 9,880,352 B2 | 1/2018 | Florjanczyk |
| 9,923,105 B2 | 3/2018 | Krasulick et al. |
| 9,952,099 B2 | 4/2018 | Wijepans et al. |
| 10,009,668 B2 | 6/2018 | Liboiron-Ladouceur |
| 10,014,654 B2 | 7/2018 | Yim et al. |
| 10,046,229 B2 | 8/2018 | Tran et al. |
| 10,067,426 B2 | 9/2018 | Pandey |
| 10,203,762 B2 | 2/2019 | Bradski et al. |
| 10,268,043 B2 | 4/2019 | Zhou et al. |
| 10,283,939 B2 | 5/2019 | Dawson et al. |
| 10,295,740 B2 | 5/2019 | Bourstein et al. |
| 10,310,196 B2 | 6/2019 | Hutchison |
| 10,374,699 B2 | 8/2019 | Ji et al. |
| 10,429,582 B1 | 10/2019 | Bian et al. |
| 10,436,028 B2 | 10/2019 | Dai et al. |
| 10,495,813 B2 | 12/2019 | Mahgerefteh et al. |
| 10,511,146 B2 | 12/2019 | Lebby et al. |
| 10,529,003 B2 | 1/2020 | Mazed |
| 10,613,276 B2 | 4/2020 | Mansouri et al. |
| 10,634,843 B2 | 4/2020 | Bayn et al. |
| 10,656,429 B2 | 5/2020 | Zhou et al. |
| 10,823,912 B1 | 11/2020 | Pelc et al. |
| 10,897,122 B2 | 1/2021 | Mathai et al. |
| 10,985,524 B1 | 4/2021 | Bayn et al. |
| 11,086,088 B2 | 8/2021 | Huebner et al. |
| 11,181,688 B2 | 11/2021 | Krasulick et al. |
| 11,320,718 B1 | 5/2022 | Mahmoud et al. |
| 11,480,728 B2 | 10/2022 | Bayn et al. |
| 11,482,513 B2 | 10/2022 | Krasulick et al. |
| 11,500,139 B2 | 11/2022 | Zhou et al. |
| 11,525,967 B1 | 12/2022 | Bismuto et al. |
| 11,881,678 B1 | 1/2024 | Bishop et al. |
| 11,886,005 B2 | 1/2024 | Sakamoto et al. |
| 11,914,201 B2 | 2/2024 | Witmer et al. |
| 2002/0031711 A1 | 3/2002 | Steinberg et al. |
| 2002/0110335 A1 | 8/2002 | Wagner et al. |
| 2004/0208428 A1 | 10/2004 | Kikuchi et al. |
| 2005/0205951 A1 | 9/2005 | Eskridge |
| 2006/0002443 A1 | 1/2006 | Farber et al. |
| 2006/0045144 A1 | 3/2006 | Karlsen et al. |
| 2006/0045158 A1 | 3/2006 | Li |
| 2006/0182445 A1 | 8/2006 | Lee et al. |
| 2008/0044128 A1 | 2/2008 | Kish et al. |
| 2009/0103580 A1 | 4/2009 | Farmer et al. |
| 2011/0069731 A1 | 3/2011 | Gokay |
| 2011/0158651 A1 | 6/2011 | Tang et al. |
| 2011/0286691 A1 * | 11/2011 | Hopkins ............... G02B 6/3897 |
| | | 385/14 |
| 2014/0029943 A1 | 1/2014 | Mathai et al. |
| 2014/0160751 A1 | 6/2014 | Hogan et al. |
| 2018/0113216 A1 * | 4/2018 | Kremer .................. G01S 17/42 |
| 2019/0004151 A1 | 1/2019 | Abediasl et al. |
| 2019/0011639 A1 | 1/2019 | Abediasl et al. |

(56) References Cited

U.S. PATENT DOCUMENTS

| | | |
|---|---|---|
| 2019/0204419 A1 | 7/2019 | Baba et al. |
| 2019/0339468 A1 | 11/2019 | Evans |
| 2019/0342009 A1 | 11/2019 | Evans |
| 2019/0342010 A1 | 11/2019 | Evans et al. |
| 2020/0256956 A1 | 8/2020 | Luff et al. |
| 2020/0343695 A1 | 10/2020 | Mathai et al. |
| 2022/0021179 A1 | 1/2022 | Lee et al. |
| 2022/0128666 A1 | 4/2022 | Schrans et al. |
| 2023/0011177 A1 | 1/2023 | Arbore |
| 2023/0012376 A1 | 1/2023 | Arbore et al. |
| 2023/0107907 A1 | 4/2023 | Bismuto et al. |
| 2023/0228945 A1 | 7/2023 | Shah et al. |
| 2023/0277062 A1 | 9/2023 | Dalvi et al. |
| 2023/0324286 A1 | 10/2023 | Pelc et al. |

FOREIGN PATENT DOCUMENTS

| | | |
|---|---|---|
| DE | 102004063569 | 9/2005 |
| DE | 60219161 T2 | 12/2007 |
| JP | H07297324 | 11/1995 |
| JP | 2006186288 | 7/2006 |
| JP | 2018518836 | 7/2018 |
| JP | 2021139832 | 9/2021 |
| WO | WO 00/041281 | 7/2000 |
| WO | WO 06/030611 | 3/2006 |
| WO | WO 07/100037 | 9/2007 |
| WO | WO 14/141451 | 9/2014 |
| WO | WO 17/184524 | 10/2017 |
| WO | WO 19/152990 | 8/2019 |
| WO | WO 20/086744 | 4/2020 |
| WO | WO 20/106974 | 5/2020 |
| WO | WO 20/180612 | 9/2020 |
| WO | WO 20/240796 | 12/2020 |
| WO | WO 21/116766 | 6/2021 |
| WO | WO 22/029486 | 2/2022 |

OTHER PUBLICATIONS

Bogaerts, et al., "Off-Chip Coupling," *Handbook of Silicon Photonics*, CRC Press, Apr. 2013, 43 pages.

Chang et al., "A Comb-Drive Actuator Driven by Capacitively-Coupled-Power," *Sensors*, 2012, pp. 10881-10889.

Dhoore et al., "Novel adiabatic tapered couplers for active III-V/SOI devices fabricated through transfer printing," Ghent University, Belgium, Optical Society of America, 2016, 16 pages.

He et al., "Integrated Polarization Compensator for WDM Waveguide Demultiplexers," *IEEE Photonics Technology Letters* vol. 11, No. 2, Feb. 1999, pp. 224-226.

Holmström et al., "MEMS Laser Scanners: A Review," *Journal of Microelectromechanical Systems*, vol. 23, No. 2, 2014, pp. 259-275.

Komljenovic et al., "Photonic Integrated Circuits Using Heterogeneous Integration on Silicon," Proceedings of the IEEE 2018, pp. 1-12.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.

Schiappelli et al., "Efficient fiber-to-waveguide coupling by a lens on the end of the optical fiber fabricated by focused ion beam milling," *Microelectronic Engineering*, 73-74, 2004, pp. 397-404.

Tsai et al., "A Laminate Cantilever Waveguide Optical Switch," 2012, downloaded Sep. 19, 2021 from IEEE Xplore, pp. 203-207.

Worhoff et al., "Flip-chip assembly for photonic circuits," MESA+ Research Institute, University of Twente, Integrated Optical MicroSystems Group, The Netherlands, 12 pages, 2003.

\* cited by examiner

FIG. 6B

DESPECKLING IN OPTICAL MEASUREMENT SYSTEMS

CROSS-REFERENCE TO RELATED APPLICATIONS

This application is a nonprovisional and claims the benefit under 35 U.S.C. § 119(e) of U.S. Provisional Patent Application No. 63/409,538, filed Sep. 23, 2022, and U.S. Provisional Patent Application No. 63/461,777, filed Apr. 25, 2023, the contents of which are incorporated herein by reference as if fully disclosed herein.

FIELD

The described embodiments relate generally to optical measurement systems that utilize multiple emitters to generate light during a measurement. More particular, the described embodiments include optical measurement systems that can selectively adjust the phase of light emitted from the multiple emitters during a measurement to reduce coherent noise.

BACKGROUND

Optical measurement systems can be used to identify the presence, type, and/or one or more characteristics of objects or substances in the environment surrounding the optical measurement system. Depending on what is being measured by the optical measurement system (e.g., the type or characteristics of a sample that is being measured), the signal-to-noise ratio ("SNR") for individual measurements can be limited by different noise sources. For example, coherent noise sources, such as speckle noise, may limit the SNR in many instances. Accordingly, it may be desirable to configure an optical measurement system to reduce the amount of noise present in measurements performed by the optical measurement system.

SUMMARY

Embodiments optical measurement systems that utilize multiple emitters to emit light during a measurement, as well as methods of performing measurements using these optical measurement systems. In some embodiments, an optical measurement system includes a light generation assembly having a light source unit that is configured to generate light. The optical measurement system further includes a photonic integrated circuit that has a launch group. The launch group includes a plurality of emitters optically coupled to the light generation assembly to receive light generated by the light generation assembly. The optical measurement system further includes a detector group, and a controller configured to perform a measurement using the light generation assembly, the launch group, and the detector group.

In some embodiments, the measurement includes generating light using the light source unit and simultaneously emitting the generated light from each of the plurality of emitters such that the plurality of emitters emits light at a corresponding set of phase states defined by a measurement state. The measurement further includes changing, during the simultaneous emission of the generated light, the measurement state between a plurality of target measurement states having a common phase state distribution. The measurement also includes measuring, using the detector group, return light received during the simultaneous emission of the generated lighted light, such that, during the measurement, the plurality of emitters only emits light at measurement states having the common phase state distribution.

In some of these variations, the launch group is a first launch group, and the photonic integrated circuit includes a plurality of launch groups that includes the first launch group, such that each launch group of the plurality of launch groups is optically coupled to the light generation assembly to receive light generated by the light generation assembly. Similarly, the detector group may be a first detector group, and the optical measurement system includes a plurality of detector groups that includes the first detector group. In some of these variations, the measurement is a first measurement, and the controller is configured to perform a second measurement using the light generation assembly, a second launch group of the plurality of launch groups, and a second detector group of the plurality of detector groups. In some of these variations, the controller is configured to perform the first measurement concurrently with the second measurement.

Additionally or alternatively, the photonic integrated circuit may include a phase shifter array having a plurality of phase shifters, such that each phase shifter of the plurality of phase shifters is controllable to change a phase state of light emitted by a corresponding emitter of the plurality of emitters. In these variations, the controller is configured to, during the measurement, control the phase shifter array to adjust the relative phase states of the plurality of emitters such that plurality of emitters emits light at the corresponding set of phase states for each of the plurality of target measurement states. In some of these variations, the optical measurement system may include a driver configured to control the phase state of each phase shifter of the plurality of phase shifters.

In some variations, the driver includes a plurality of switch-shifter pairs connected in series to a power supply. Each switch-shifter pair of the plurality of switch-shifter pairs includes a corresponding phase shifter of the plurality of phase shifters and a switch connected in parallel to the corresponding phase shifter of the plurality of phase shifters. In other variations, the driver includes a plurality of controllable current sources connected in parallel to a power supply, such that each controllable current source of the controllable current source is connected in series to a corresponding phase shifter of the plurality of phase shifters.

In some variations, the light generation assembly includes a switch network that optically couples the light source unit to the plurality of emitters. Additionally or alternatively, the optical measurement system may include an interposer, wherein the photonic integrated circuit and the plurality of detector groups are mounted on the interposer. In some variations, each phase state of plurality of the target measurement states is selected from a binary pair of candidate phase states.

Other embodiments are directed to an optical measurement system that includes a light generation assembly having a light source unit that is configured to generate light, as well as a controller and a photonic integrated circuit that includes a launch group and a phase shifter array. The optical measurement system may be configured such that the launch includes a plurality of emitters, and each emitter of the plurality of emitters is optically coupled to the light generation assembly to receive light generated by the light generation assembly and emit a corresponding beam of light. Similarly, the phase shifter array includes a plurality of phase shifters, such that each phase shifter of the plurality of phase shifters is controllable to set a phase state of the beam of light emitted by a corresponding emitter of the plurality of emitters.

The controller is configured to control the light generation assembly to generate light such that the plurality of emitters simultaneously emits light from the photonic integrated circuit. The controller also controls, while the plurality of emitters simultaneously emits light, the phase shifter array to repeatedly cycle a measurement state of the plurality of emitters between a plurality of target measurement states; such that each of the plurality of target measurements states has a common phase state distribution. The optical measurement system may further include a detector group, wherein the controller is configured to measure, using the detector group, return light received while the plurality of emitters simultaneously emits light. In some of these variations, the optical measurement system includes an interposer, wherein the photonic integrated circuit and the plurality of detector groups are mounted on the interposer.

Additionally or alternatively, the optical measurement system includes a driver configured to control the phase state of each phase shifter of the plurality of phase shifters. In some of the variations, the driver controls the phase state of each phase shifter of the plurality of phase shifters based on a phase encoding matrix. Additionally or alternatively, the driver includes a plurality of switch-shifter pairs connected in series to a power supply. In these variations, each switch-shifter pair of the plurality of switch-shifter pairs includes a corresponding phase shifter of the plurality of phase shifters, and a switch connected in parallel to the corresponding phase shifter of the plurality of phase shifters. In other variations, the driver includes a plurality of controllable current sources connected in parallel to a power supply, such that each controllable current source of the controllable current source is connected in series to a corresponding phase shifter of the plurality of phase shifters.

Additionally or alternatively, the light generation assembly may include a switch network that optically couples the light source unit to the plurality of emitters. In some variations, each phase state of plurality of the target measurement states is selected from a binary pair of candidate phase states. Additionally or alternatively, the plurality of target measurement states may be a first plurality of target measurement states, the common phase state distribution may a first common phase state distribution, and the controller may be configured to control, while the plurality of emitters simultaneously emits light, the phase shifter array to repeatedly cycle a measurement state of the plurality of emitters between a second plurality of target measurement states. In these instances, the second plurality of target measurement states has a second common phase state distribution different than the first phase state distribution.

Still other embodiments are directed to methods of performing a measurement using an optical measurement system. The method may include simultaneously emitting light from a plurality of emitters of a launch group of a photonic integrated circuit, and performing a measurement sequence including a first measurement stage and a second measurement stage. Performing the first measurement stage may include controlling, while the plurality of emitters simultaneously emits light, a phase shifter array to perform at least one first iteration in which a measurement state of the plurality of emitters is changed between a first plurality of target measurement states having a first common phase state distribution. The first measurement stage also includes measuring, using a detector group, return light received during the at least one first iteration.

Similarly, the second measurement stage includes controlling, while the plurality of emitters simultaneously emits light, the phase shifter array to perform at least one second iteration in which the measurement state of the plurality of emitters is changed between a second plurality of target measurement states having a second common phase state distribution that is different than the first common phase state distribution. The second measurement stage also includes measuring using the detector group, return light received during the at least one second iteration.

In some of these variations, performing the first measurement stage includes performing multiple first iterations. Additionally or alternatively, performing the second measurement stage includes performing multiple second iterations. Additionally or alternatively, the method may include repeating the measurement sequence. In some of these variations, repeating the measurement sequence includes changing an order of the first measurement stage and the second measurement stage.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 6B depicts an example phase encoding matrix that may be used with the optical measurement systems described herein to perform the method of FIG. 6A.

Figure 1A:
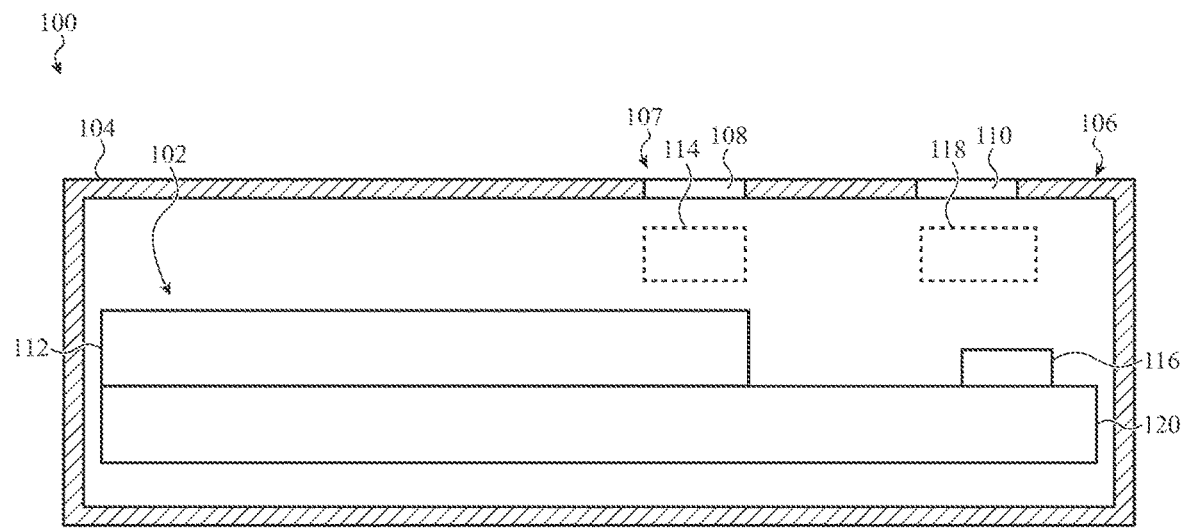
FIG. 1A shows a partial cross-sectional side view of a device incorporating an optical measurement system as described herein.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to embodiments of optical measurement systems that utilize multiple emitters to emit light during a measurement, as well as methods of performing measurements using these optical measurement systems. The optical measurement systems may include a light generation assembly that is configured to generate light via a light source unit, and a photonic integrated circuit that includes a launch group having a plurality of emitters. Each of these emitters is optically coupled to the light generation assembly to receive light generated from the light generation assembly, and may emit this light from a surface of the photonic integrated circuit. The optical measurement system may perform a measurement in which the light generation assembly generates light and each of the plurality of emitters simultaneously emit light received from the light generation assembly.

Each emitter emits light at a corresponding phase state that represents a relative phase of the light. The phase states of each of the plurality of emitters defines a measurement state for the plurality of emitters (and thereby the launch group). During a measurement, the launch group may be changed between a plurality of different target measurement states, where each target measurement state defines a target phase state for each of the plurality of emitters. Changing between different target measurement states changes the phase state of at least one emitter of the plurality of emitters. Changing between different target measurement states during a measurement may reduce coherent noise associated with the measurement as described herein.

The optical measurement systems described herein may be configured such that a given measurement only utilizes target measurement states having a common phase state distribution. As used herein, the "phase state distribution" of a measurement state refers to the relative number of emitters that are configured to emit each phase state of a given measurement state. For example, when each phase state of a measurement state is selected from a binary pair of candidate states (i.e., each emitter either has a first phase state or a second phase state), the phase state distribution refers to the numbers of emitters that have the first phase state and the second phase state. Two measurement states with a common phase state distribution will have the same numbers of emitters with the first and second phase states, as described in more detail herein. In some instances, the optical measurement system is configured so that light emitted by a launch group repeatedly cycles between a plurality of measurement states having a common phase state distribution. In some instances, the optical system may perform multiple measurements, during which a first measurement (or set of measurements) is performed using a first plurality of measurement states having a first common phase state distribution and a second measurement (or set of measurements) is performed using a second plurality of measurement states having a second common phase distribution that is different than the first common phase state distribution.

To set the measurement state of a launch group, the photonic integrated circuits of the optical measurement systems described herein may include a phase shifter array operatively connected to the launch group. The phase shifter array comprises a plurality of phase shifters, and each of these phase shifters is controllable to change a phase state of a corresponding emitter of the launch group. Accordingly, the phase shifter array may be controlled to set the measurement state of the launch group by setting the phase states of the individual emitters of the launch group. The phase shifter array is controlled to change the launch group between target measurement states having a common phase state distribution, the phase shifter array may beneficially present a balanced load to a power supply of the optical measurement system. Also described herein are drivers configured to control the phase shifter array to set these load-balanced measurement states.

These and other embodiments are discussed below with reference to FIGS. 1A-6B. However, those skilled in the art will readily appreciate that the detailed description given herein with respect to these Figures is for explanatory purposes only and should not be construed as limiting.

The embodiments of the optical measurement systems described herein may be incorporated into a device having a housing. The device, which in some instances is wearable, may operate solely to take measurements using the optical measurement system or may be a multi-functional device capable of performing additional functions (not discussed in detail herein). For example, in some instances the optical measurement system may be incorporated into a smart phone, tablet computing device, laptop or desktop computer, a smartwatch or other wearable, or other electronic device (collectively referred to herein as "electronic devices" for ease of discussion).

The device may include a display (which may be a touchscreen display) that provides a graphical output that is viewable through or at an exterior surface of the device. When the display is configured as a touchscreen, the display may be capable of receiving touch inputs at the exterior surface. The device may include a cover sheet (e.g., a cover glass) positioned over the display that forms at least a portion of the exterior surface. The display is capable of providing graphical outputs and, when configured as a touch screen, receiving touch inputs through the cover sheet. In some embodiments, the display includes one or more sensors (e.g., capacitive touch sensors, ultrasonic sensors, or other touch sensors) positioned above, below, or integrated with the display portion. In various embodiments, a graphical output of the display is responsive to inputs provided to the electronic device. The portable electronic device may include additional components typical of computing devices, including a processing unit, memory, input devices, output devices, additional sensors, and the like.

Figure 1B:
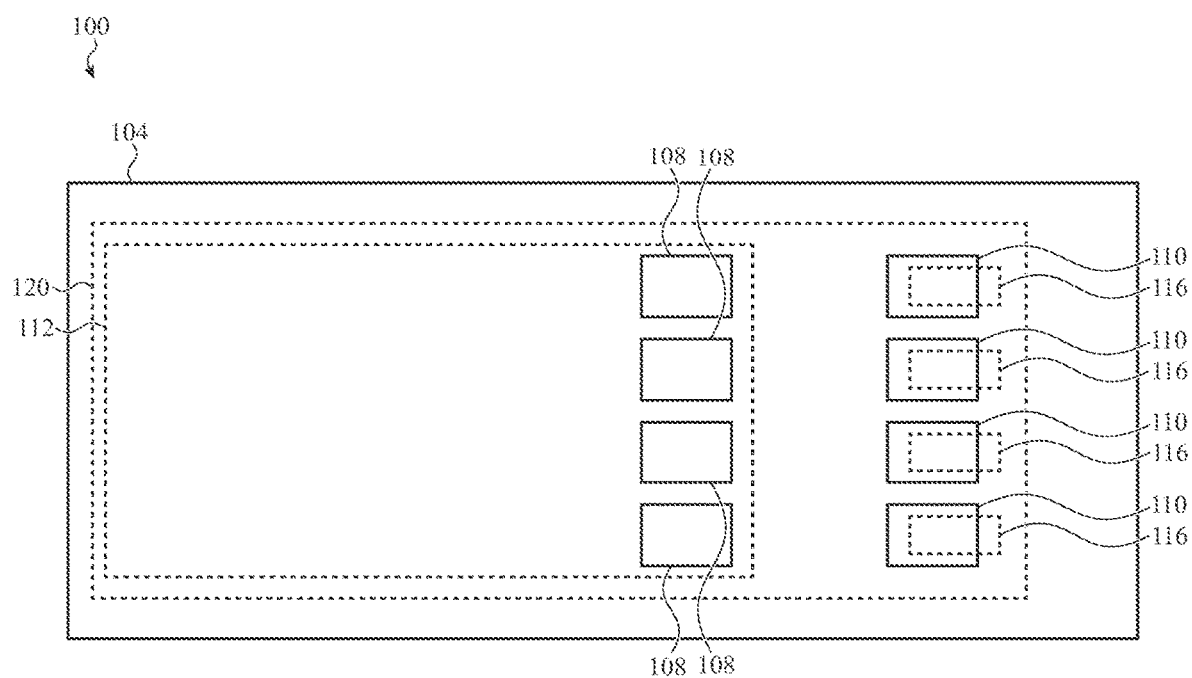
FIG. 1B shows a top view of the device of FIG. 1A.

FIGS. 1A and 1B show an example of a device 100 that houses an optical measurement system 102 as described herein. FIG. 1A shows a side view of a device 100 comprising, for example, a housing 104 having a top exterior surface 106 (the housing 104 is depicted as a cross-section in FIG. 1A to reveal a side view of components of the optical measurement system 102 that are positioned within the housing 104). This top exterior surface 106 defines a sampling interface 107 for the optical measurement system 102, through which light emitted by the optical measurement system 102 can exit the device 100 and re-enter the device 100 to return to the optical measurement system 102. The sampling interface 107 includes at least one window that defines one or more emission regions 108 (through which light emitted by the optical measurement system 102 may exit the device 100) and one or more collection regions 110 (through which light entering the device 100 may reach a predetermined portion of the optical measurement system 102, such as a detector). In the variation shown in FIGS. 1A and 1B, the device includes a plurality of emission regions 108 and a plurality of collection regions 110. While FIGS. 1A and 1B depict an equal number of emission regions 108 and collection regions 110, in other instances the sampling interface 107 has an unequal number of emission regions 108 and collection regions 110. Each emission region 108 and collection region 110 is transparent at any wavelength or wavelengths used by the optical measurement system 102 to perform the measurements discussed herein (collectively the "measurement wavelengths"). Each emission region 108 and collection region 110 may be defined by a corresponding window (transparent at the measurement wavelengths) that are separated from each other by one or more opaque portions of the housing (i.e., that absorb or otherwise block light transmission at the measurement wavelengths). In other variations, some or all of the emission regions 108 and/or collection regions 110 are defined in a common window (e.g., using a mask that is opaque at the measurement wavelengths). Additionally or alternatively, the device 100 may include barriers, baffles, or other light-blocking structures (not shown) that may at least partially define some or all of the emission regions 108 and collection regions 110. These light-blocking structures block stray light and act as a guide to limit the paths that light can take between the optical measurement system 102 and the sampling interface 107.

As shown in FIGS. 1A and 1B, the optical measurement system 102 comprises a photonic integrated circuit 112. The photonic integrated circuit 112 includes one or more launch groups, and is able to selectively emit light from each launch group. In instances where the photonic integrated circuit 112 includes multiple launch groups, the photonic integrated circuit 112 is capable of emitting light from each of these launch groups. Light emitted from each launch group of the photonic integrated circuit 112 can exit the device 100 through the sampling interface 107 (e.g., via a corresponding emission region 108). In some variations, the optical measurement system 102 optionally includes one or more light modification components, shown schematically as box 114, positioned between the photonic integrated circuit 112 and the sampling interface 107, which alters the light emitted from the photonic integrated circuit 112 before it reaches the sampling interface 107. For example, the light modification components 114 may include one or more lenses (which change the divergence and/or direction of the light), one or more diffusers, mirrors, or the like. Additionally or alternatively, the sampling interface 107 itself may act as a light modification component (e.g., it may have an integrated lens or the like that can change the divergence and/or direction of the light passing therethrough). The light emitted from a given launch group interacts with the sampling interface 107 and any intervening components (such a light modification components 114) to control where that light exits from device 100, and thus defines a launch site of the optical measurement system 102. In instances where the photonic integrated circuit 112 includes multiple launch groups, the optical measurement system 102 may include multiple different launch sites from which light may be emitted from the optical measurement system 102 (and thus emitted from the device 100 incorporating the optical measurement system 102).

The optical measurement system further comprises one or more detector groups 116, each of which includes a corresponding set of detectors. Each detector group 116 is positioned within the device 100 to receive light that has entered the device 100 through the sampling interface 107 (e.g., via a corresponding collection region 110). In some variations the optical measurement system 102 comprises one or more light modification components, shown schematically as box 118, positioned between the sampling interface 107 and at least one detector group 116, which alters the light that enters the device 100 before it reaches the corresponding detector group (or groups). The light modification components 118 may include one or more lenses (which change the divergence and/or direction of the light), one or more diffusers, mirrors, or the like. Additionally or alternatively, the sampling interface 107 may act as a light modification component (e.g., it may have an integrated lens or the like that can change the divergence and/or direction of the light passing therethrough) that alters the light before it reaches a detector group 116.

In some instances, the photonic integrated circuit 112 and the one or more detector groups 116 are mounted to a common component. For example, in the variation shown in FIGS. 1A and 1B, the optical measurement system 102 comprises an interposer 120. In these instances, the photonic integrated circuit 112 and the one or more detector groups 116 are all mounted on the interposer 120, which in turn may act as an electrical interface for these components (e.g., to route signals to and/or from the components). In some instances, the interposer also acts as a heat sink. In other variations, the photonic integrated circuit 112 is mounted to a separate component than some or all of the detector groups 116. In still other variations, some or all of the detector groups 116 are directly mounted on (or otherwise integrated into) a portion the photonic integrated circuit 112.

Each detector groups 116 may measure light received by the optical measurement system 102 (e.g., light that has been emitted from the optical measurement system toward a sample and returned to the optical measurement system) during a measurement. The light measured by the set of detector groups during a measurement may be analyzed to determine one or more properties of the environment surrounding the optical measurement system 102 (e.g., the presence, type, and/or one or more characteristics of an object measured by the optical measurement system), which will collectively be referred to herein as a "sample". Light may be measured by a detector group while a corresponding launch group is emitting light (for determining how the emitted light interacts with the sample), and light may optionally also be measured while the corresponding launch group is not actively emitting light (for measuring background light which can assist in background correction operations).

Each detector group 116 may be associated with a corresponding launch group, such that each detector group 116 is positioned to measure light that has been emitted by the corresponding launch group and returned to the optical measurement system 102 (e.g., by interacting with a sample external to the optical measurement system). The optical measurement system 102 may be configured such that, when the optical systems is used to measure aspects of a predetermined type of sample, light emitted by one launch group will not reach detector groups associated with other launch groups. In this way, each launch group and its corresponding detector group may perform a measurement of a corresponding portion of a sample without interfering with other measurements being concurrently being performed by another launch group/detector group pair.

For example, the optical measurement system 102 may include a plurality of launch groups that includes a first launch group and a second launch group, and a plurality of detector groups that includes a first detector group and the second detector group. Components of the optical measurement system 102 may be controlled (e.g., using a controller as described herein) to perform a first measurement using the first launch group and the first detector group and a second measurement using the second launch group and the second detector group. The first measurement and the second measurement may be performed concurrently, such that the first launch group and second launch group simultaneously emit light for at least a portion of each of the first and second measurements.

Figure 2:
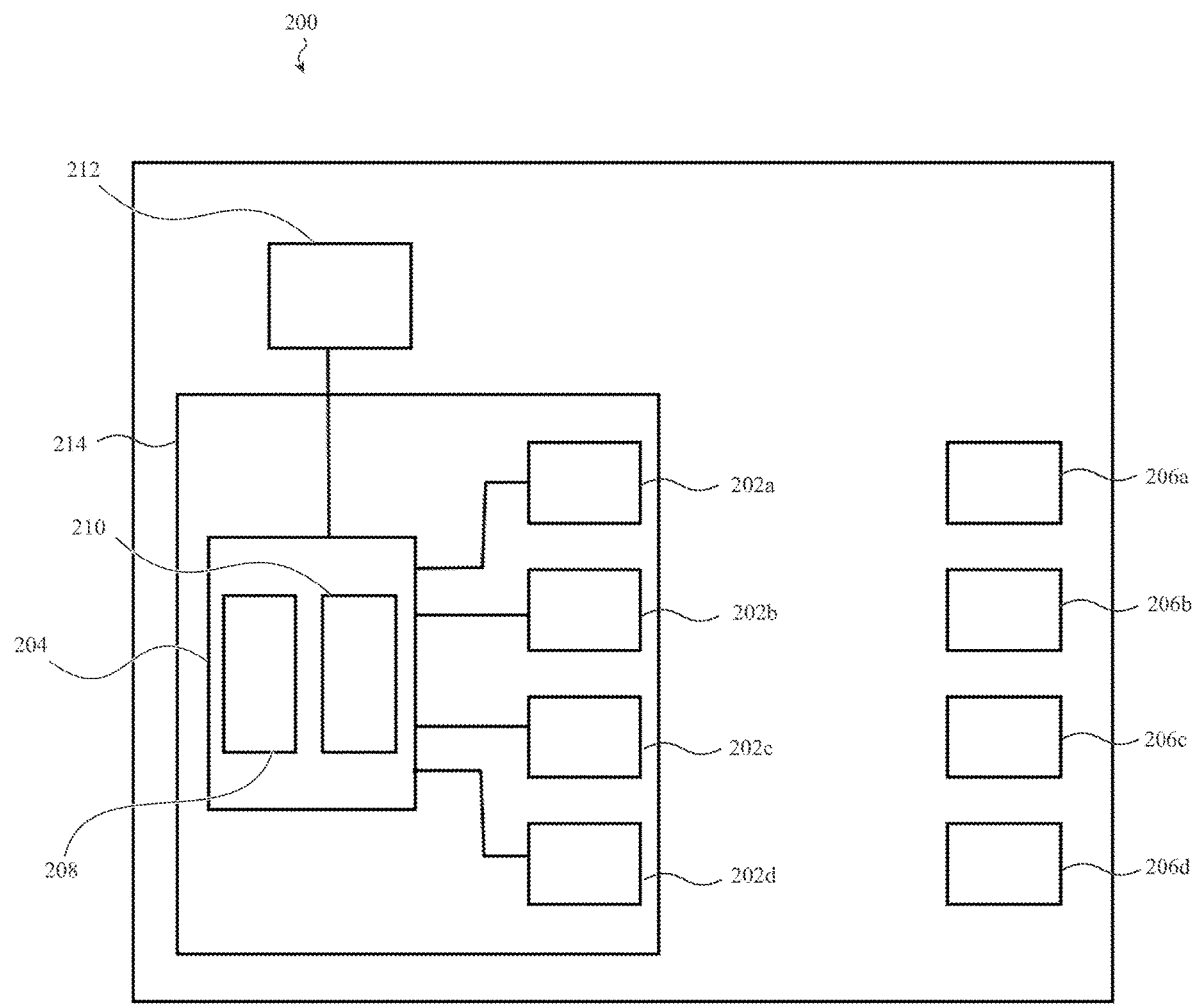
FIG. 2 shows a schematic diagram of a variation of an optical measurement system as described herein.

FIG. 2 shows a schematic diagram of an optical measurement system 200 as described herein. The optical measurement system 200 includes a set of launch groups 202a-202d, a light generation assembly 204, and a set of detector groups 206a-206d. The light generation assembly 204 is configured to generate light and route the light to the set of launch groups 202a-202d, thereby allowing each launch group 202a-202d to emit light. Accordingly, light may exit the optical measurement system 200 via the set of launch groups 206a-206d, and the optical measurement system 200 may measure light returned to the optical measurement system 200 using some or all of the detector groups 206a-206d. While the optical measurement system 200 is shown in FIG. 2 as having four launch groups 202a-202d and four detector groups 206a-206d, it should be appreciated that the optical measurement system 200 may include any number of launch groups and detector groups. For example, some embodiments of the optical measurement systems described herein may include a single launch group and a single detector group. Indeed, the principles discussed herein as applied to a single launch group/detector group pair of an optical measurement system may be extended to any or all of the other launch groups and detector groups of the optical measurement system.

The light generation assembly 204 may include a light source unit 208 having a set of light sources (not shown) each of which is selectively operable to emit light at a corresponding set of wavelengths. The set of light sources may be controlled to generate the light that is routed from the light generation assembly 204 to the set of launch groups 202a-202d. Each light source may be any component capable of generating light at one or more particular wavelengths, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times). The set of light sources may include any suitable combination of light sources, and collectively may be operated to generate light at any of a plurality of different wavelengths.

In some variations, the light source unit 208 includes multiple sets of light sources, where each set of light sources is associated with a corresponding launch group of the set of launch groups 202a-202d. In these instances, each launch group may receive light generated from a different set of light sources of the light source unit 208. In other variations, multiple launch groups of the set of launch groups 202a-202d may receive light from a common set of light sources of the light source unit 208. For example, the light generation assembly 204 may include a switch network 210 that is configured to selectively route light generated by the light source unit 208 to any or all of the set of launch groups 202a-202d.

Specifically, the switch network 210 receives light from the light source unit 208 via one or more inputs, each of which is optically coupled to a corresponding output of the light source unit 208 to receive light therefrom. The switch network 210 may include a plurality of outputs, each of which is connected to a corresponding launch group of the set of launch groups 202a-202d. The switch network 210 is controllable to take light received at one of its inputs and direct that light to some or all of its outputs simultaneously. For example, the switch network 210 may be configured in a first instance to route light from the light source unit 208 to a single launch group (e.g., a first launch group 202a), or may simultaneously route the light to multiple launch groups (e.g., all four launch groups 202a-202d). In these instances, the light source unit may include relatively fewer light sources, as a single set of light sources may be used to provide light to multiple launch groups.

Each detector group of the set of detector groups 206a-206d includes one or more sets of detector elements. Each detector element is capable of generating a corresponding signal representative of light incident thereon, which collectively may form a set of output signals for a detector group. Individual detector elements can either be a stand-alone detector or a single sensing element of a larger detector array (e.g., a photodiode of a photodiode array). It should be appreciated that different sensing elements of a single detector array may be associated with different detector groups. For example, a detector array may include a first subset of sensing elements associated with a first detector group and a second subset of sensing elements associated with a second detector group. It should also be appreciated that the detector elements within a given detector group of the set of detector groups 206a-206d need not be immediately adjacent to each other. Overall, the set of detector groups 206a-206d measure light emitted from the optical measurement system 200 via the set of launch groups 202a-202d, which may facilitate the various measurements described herein.

As discussed herein, each of the set of launch groups 202a-202d is formed as part of a photonic integrated circuit 214. Some or all of the light generation assembly 204 (e.g., the light source unit 208 and/or the switch network 210) may also be integrated into the photonic integrated circuit 214. For example, in some instances the light sources of the light source unit 208 are all integrated into the photonic integrated circuit 214, such as shown in FIG. 2. In other instances some or all of the light sources generate light externally from the photonic integrated circuit 214 and light from these light sources is coupled into the photonic integrated circuit 214 to reach the one or more of the set of launch groups 202a-202d. The photonic integrated circuit 214 may utilize waveguides to optically connect the components on the photonic integrated circuit 214. For example, in the embodiment shown in FIG. 2, each launch group of the set of launch groups 202a-202d may be optically coupled to the light generation assembly 204 via a corresponding waveguide.

The optical measurement system 202 may be configured such that, when the optical systems is used to measure aspects of a predetermined type of sample, light emitted by one of the set of launch groups 202a-202d will not reach detector groups associated with other launch groups 202a-202d. For example, in some variations a first launch group 202a is paired with a first detector group 206a, while a second launch group 202b is paired with a second detector group 206b. In these instances, the optical measurement system 202 may be configured such that the first detector group 206a is positioned so that it will receive light that is generated by the first launch group 202a but will not receive light generated by the second launch group 202b during operation of the optical measurement system 202. Similarly, the second detector group 206b is positioned so that it will receive light that is generated by the second launch group 202b but will not receive light generated by the first launch group 202a during operation of the optical measurement system 200. In these ways, the two launch group-detector group pairs may simultaneously perform measurements of different portions of a sample without crosstalk. Additionally, in these variations each launch-group-detector group pair may be associated with a different emission region 108 and collection region 110 as discussed herein, or may be associated with the same emission region 108 and collection region 110.

Also shown in FIG. 2 is a controller 212, which controls operation of the optical measurement system 200 to perform the various measurements as described herein. Specifically, the controller 212 may control the light generation assembly 204 to generate and route light to one or more of the set of launch groups 202a-202d. For example, in instances where the light generation assembly 204 includes both the light source unit 208 and the switch network 210, the controller 212 may control one or more light sources of the light source unit 208 to generate a selected wavelength (or wavelengths) of light. The controller 212 may further control the switch network 210 to route light received from the light source unit 208 to a selected number of the launch groups 202a-202d. The controller 212 may further control the set of detector groups 206a-206d to generate sets of output signals from some or all of the detector groups 206a-206d, where these sets of output signals represent the light received by the detector elements of the detector groups 206a-206d. These sets of output signals may be processed and analyzed to determine one or more properties of a sample. The controller 212 may include any combination of software, hardware, and firmware as needed to perform these functions (including any of the method steps described below), including, for example, one or more processors and/or application-specific integrated circuits (ASICs).

As described herein, each launch group of a photonic integrated circuit may be used to emit light from the photonic integrated circuit, which may also be emitted from an optical measurement system to perform a measurement of a sample. When the light source of the light source units described herein include coherent light sources, such as lasers, measurements performed using coherent illumination may be subject to coherent noise (also referred to herein as "speckle" noise). Specifically, the interference of coherent light as it scatters through a sample may result in spatial intensity variations of light received by a detector group that may reduce the SNR of a given measurement. Accordingly, it may be desirable to configure the system to reduce speckle noise (also referred to herein as "despeckling") for a given measurement performed by an optical measurement system as described herein.

Accordingly, some or all of the launch groups of a given photonic integrated circuit include a plurality of individual emitters. Each emitter may be optically coupled to a light generation assembly to receive light therefrom, and may thereby emit light received from the light generation assembly. The light emitted by the plurality of emitters of a given launch group collectively forms the light emitted by the launch group. In these instances, each launch group is configured such that each of its corresponding emitters emits light at a different position and/or angle, and the optical measurement system is configured such that the light emitted from each emitter is also introduced to a sample at a different position and/or angle relative to light emitted by other emitters of that launch group. If the angles and/or positions are sufficiently different between a pair of emitters, light emitted from the pair of emitters may generate an uncorrelated speckle noise patterns. Capturing uncorrelated speckle noise patterns between the emitters of launch group may reduce the overall speckle noise associated with a given measurement.

Simultaneously emitting light from all of the emitters of a launch group, however, does not necessarily improve the speckle noise for a given measurement, as the light from each emitter of the launch group may be coherent with the other emitters. In order to reduce speckle noise, it is preferable to incoherently sum the relative contribution of each emitter to the overall measurement signal. In one example, light may be sequentially emitted by each emitter of the launch group such that only one emitter is emitting light at a given time. These individual "sub-measurements" may add incoherently to generate a measurement with reduced speckle noise.

In some instances, the design constraints associated with a given optical measurement system may make it impractical or otherwise undesirable to configure the optical measurement system to sequentially route light to a single emitter of a launch group at a time, especially as the number of emitters associated with a launch group increases. As an alternative, multiple emitters of a launch group may emit light simultaneously, but the phase states of these emitters may be changed over the course of the measurement to change the relative phases of light emitted by the plurality of emitters. In other words, the measurement state of the launch group and its plurality of emitters may be changed over time between a plurality of target measurement states to change the relative phases of light emitted by the plurality of emitters. Depending on the selection of these target measurement states, changing the measurement state within a given measurement may provide a similar amount of despeckling as if the light were emitted sequentially from each of the plurality of emitters.

Figure 3:
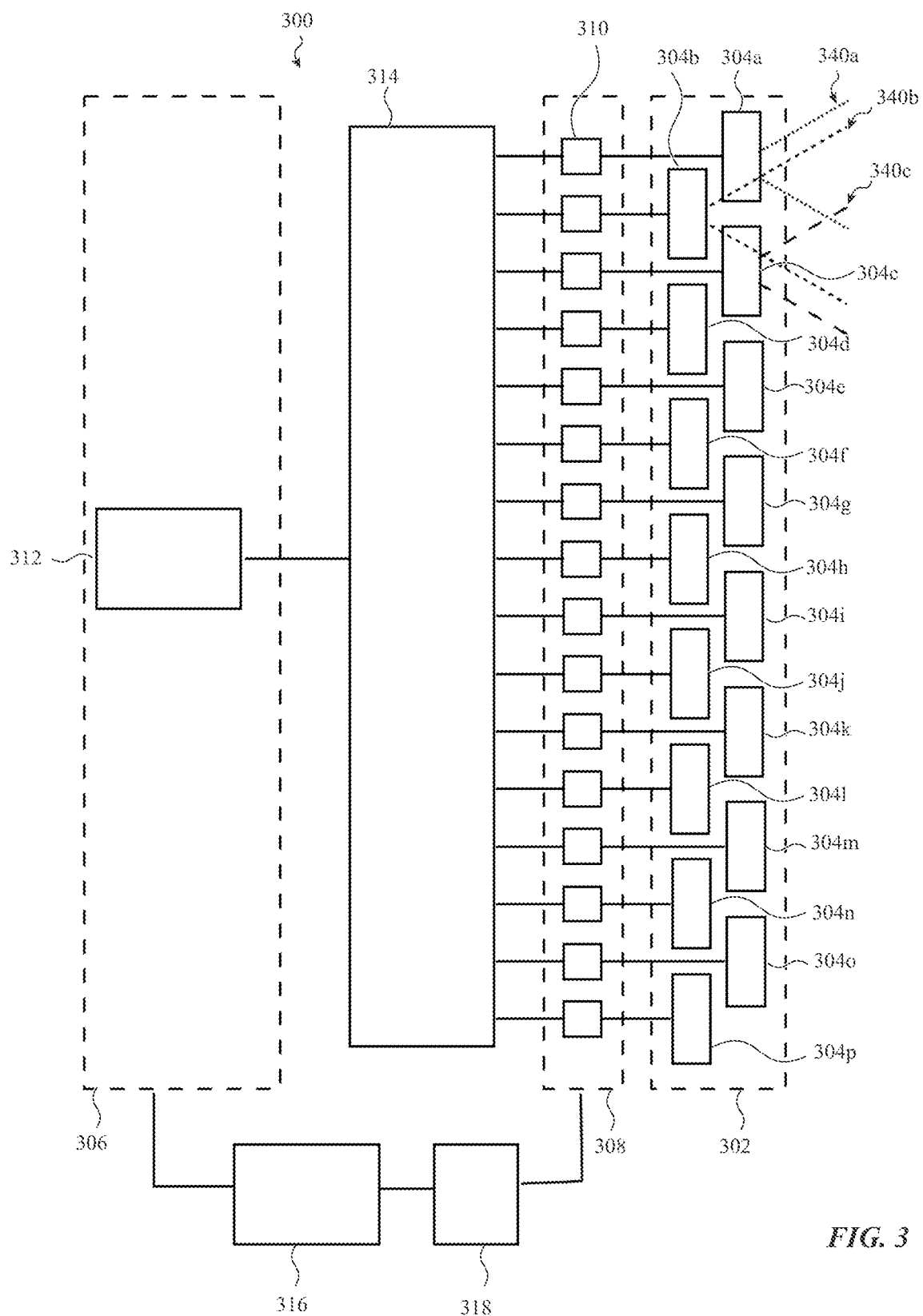
FIG. 3 shows a schematic diagram of a portion of an optical measurement system having a launch group with multiple emitters and a phase shifter array.

For example, FIG. 3 shows a schematic diagram of a portion of an optical measurement system 300 as described herein. As shown there, the optical measurement system 300 includes a launch group 302 (which is formed as part of a photonic integrated circuit as described herein) that is optically coupled to a light generation assembly 306, such that the launch group 302 receives and emits light generated by the light generation assembly 306. While the light generation assembly 306 is shown in FIG. 3 as having a light source unit 312 (which may be configured in any manner as described herein with respect to the light source unit 208 of FIG. 2), it should be appreciated that the light generation assembly 306 may also include a switch network (not shown) that may selectively optically couple the light source unit 312 to the launch group 302. In these instances, the switch network may also optically couple the light source unit 312 to other launch groups (not shown) of the photonic integrated circuit to selectively route light to some or all of those launch groups.

In the variation shown in FIG. 3, the launch group 302 includes a plurality of emitters 304a-304p. Each emitter may be configured as an outcoupler (e.g., an edge coupler, a vertical output coupler, or the like) that is configured to launch light from the photonic integrated circuit at a predetermined position and angle relative to the launch group 302. While sixteen emitters 304a-304p are shown in FIG. 3, it should be appreciated that each launch group of the optical measurement systems described herein may have any suitable number of emitters as may be desired, and that different launch groups within an optical measurement system may have different numbers of emitters. Each emitter of the plurality of emitters 304a-304p may emit a corresponding beam of light, which collectively may form the overall beam of light emitted by the launch group 302. For example, FIG. 3 shows a first emitter 304a emitting a first beam 340a, a second emitter 304b emitting a second beam 340b, and a third emitter 304c emitting a third beam 340c. While each of the first beam 340a, second beam 340b, and third beam 340c are positioned relative to the photonic integrated circuit at different positions and/or angles (which may be sufficiently different to when introduced into a sample to allow for speckle noise decorrelation between these beams as described herein), there may be some overlap between these beams after they are emitted from the photonic integrated circuit, such that the individual beams form a larger collective light beam.

In some instances each emitter of the plurality of emitters 304a-304p is optically connected to a different set of light sources to receive light from its corresponding set of light sources. In other instances, it may simplify the design of the light source unit to have some or all of the plurality of emitters 304a-304p receive light from the same set of light sources. For example, in some variations, the optical measurement system 300 includes one or more optical splitters (e.g., that may be formed as part of the photonic integrated circuit) that are configured to receive light from an output of the light source unit 312 and split the received light between some or all of the emitters 304a-304p. In the variation shown in FIG. 3, the optical measurement system 300 includes one or more optical splitters (depicted, for ease of illustration, as a single optical splitter 314) that receive light from an output of the light generation assembly 306 (e.g., directly from light source unit 312, or indirectly from the light source unit 312 via a switch network as described herein or another intervening optical component) and splits the received light between all of the plurality of emitters 304a-304p. In these instances, the one or more optical splitters may include a star coupler, a cascaded array of optical splitters (e.g., 1×2 splitters or the like), other 1×N or M×N splitters, combinations thereof, or the like.

Also shown in FIG. 3 is a phase shifter array 308 that includes a plurality of phase shifters 310. Each phase shifter 310 of the phase shifter array is controllable to change the phase state of a corresponding emitter of the plurality of emitters 304a-304p. Specifically, changing the phase state of a given emitter changes the phase of light emitted by the emitter. As shown in FIG. 3, the optical measurement system 300 may include a driver 318 that is configured to separately control each of the plurality of phase shifters 310, such that the plurality of phase shifters 310 collectively set the measurement state of the launch group 302 and its plurality of emitters 304a-304p. Specifically, the driver 318 may control the plurality of phase shifters to change the launch group between multiple different target measurement states as described herein. The driver 318 may be controlled by a controller 316, which provides the target measurement states to the driver 318. The controller 316 may also control the light generation assembly 306 as described herein. While each emitter of the plurality of emitters 304a-304p is shown in FIG. 3 as having a corresponding phase shifter 310 of the phase shifter array 308, it should be appreciated that one or more emitters of the plurality of emitters 304a-304p may not be associated with a corresponding phase shifter 310 of the phase shifter array 308 (for example, the sixteenth emitter 304p may not be associated with a phase shifter 310 of the phase shifter array 308). In these instances, the phase shifter array 308 will be unable to adjust the phase state of any such emitter(s).

The individual phase shifters 310 of the phase shifter array 308 may be configured in any suitable manner to change the phase state of a corresponding emitter, and the phase shifter array 308 may include any combination of phase shifter designs as may be desired. For example, in some variations the phase shifter array 308 may include one or more thermo-optic phase shifters that change the refractive index of a portion of a waveguide (e.g., a waveguide that carries light from the light generation assembly 306 and a given emitter) by changing its temperature, thereby inducing a phase shift in the light carried by the waveguide. Additionally or alternatively, the phase shifter array 308 may include one or more carrier-based phase shifters that change the refractive index of a portion of waveguide by changing the concentration of charge carriers in the waveguide, thereby inducing a phase shift in the light carried by the waveguide. In some of these instances, a portion of the waveguide forms part of a diode (e.g., a PN diode, a PIN diode, a PIPIN diode, or the like), such that current passed through the diode changes the concentration of charge carriers in the waveguide.

Additionally or alternatively, the phase shifter array 308 may include one or more optomechanical phase shifters that utilize a moveable structure, such as a membrane or suspended waveguide, that is moveable to change an amount of evanescent coupling with a waveguide. Changing a position of the moveable structure changes the effective refractive index experienced by light traveling through the waveguide, and thereby generates a phase change in the light. An actuator, which may include a microelectromechanical system ("MEMS"), may be used to change the position of the moveable structure. In some of these variations, an optomechanical phase shifter may include a MEMS actuator having a bistable structure, such that the moveable structure is moved between one of two positions. In these instances, the optomechanical phase shifter effectively has two states: an "on" state where a particular phase change is applied to light in a waveguide and an "off" state where the phase change is removed. Accordingly, a given phase shifter 310 of the phase shifter array 308, depending on its design, may either be able to change an emitter between three or more different phase states, or may be limited to two different phase states.

When the optical measurement system 300 is used to perform a measurement, the controller 316 may be configured to selectively change, during a given measurement, the measurement state of the launch group 302. For example, the launch group may be controlled (e.g., by controlling the light generation assembly 306 with the controller 316) to simultaneously generate light from each of the plurality of emitters 304a-304p. While the plurality of emitters 304a-304p is simultaneously emitting light, the measurement state of the launch group may be changed between a plurality of target measurement states. A detector group (such as one of the detector groups 206a-206 of FIG. 2) may measure return light (i.e., light that enters the optical measurement system) that is received while the launch group emits light. The set of output signals generated by the detector during this measurement may, by virtue of the change in measurement states over the course of the measurement, average out some of the speckle noise and increase the SNR of the set of output signals.

Figure 4A:
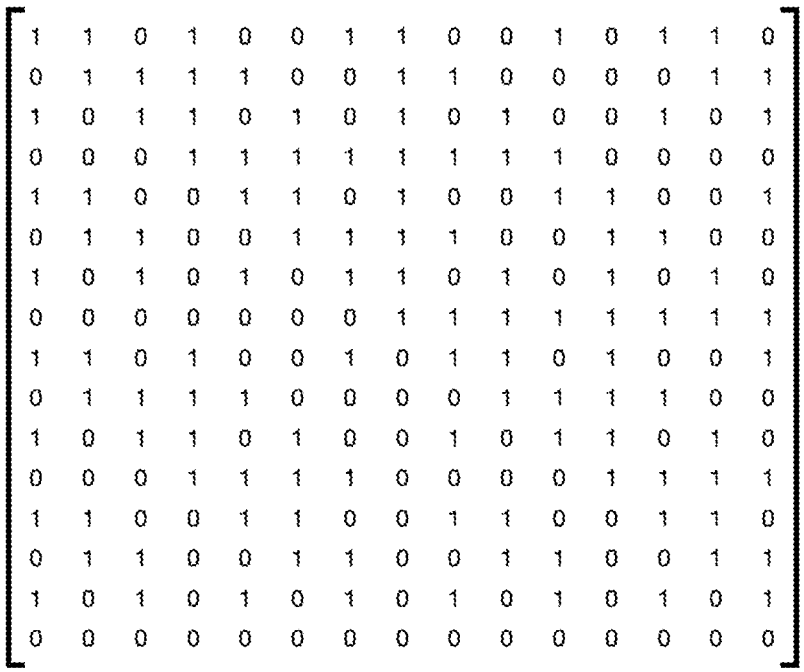
FIGS. 4A and 4B depict example phase encoding matrices that may be used with the optical measurement systems described herein.
Figure 4B:
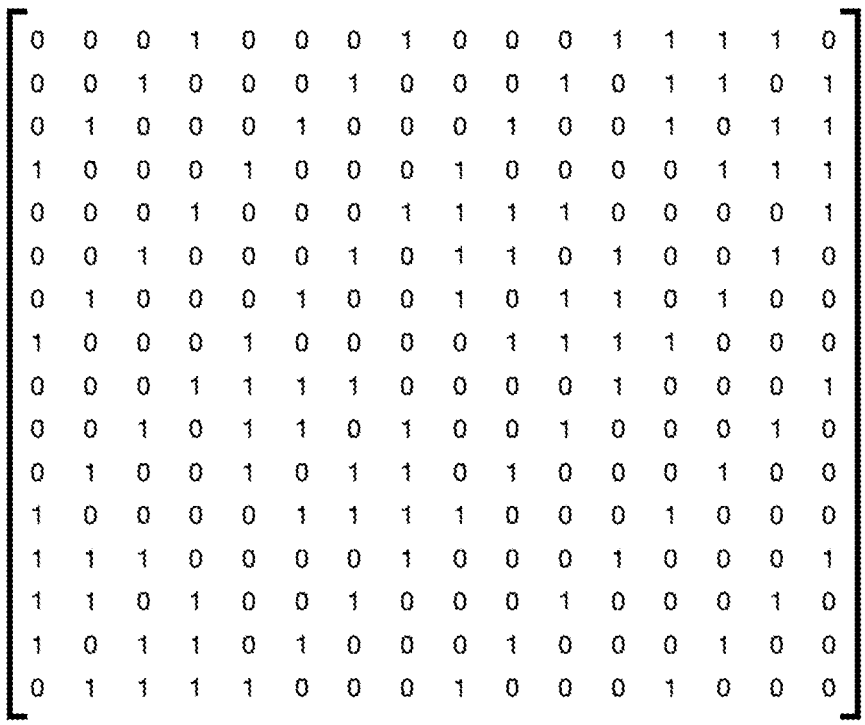

For example, the driver 318 may utilize a phase encoding matrix (which may be received from the controller 316) to set a measurement state of the launch group 302 at each point in time by setting the phase states of the plurality of emitters 304a-304p. FIGS. 4A and 4B show examples of phase encoding matrices 400 and 402, respectively, that may be used by the optical measurement systems described herein to set the relative phases of light emitted by a plurality of emitters of a launch group. Using the phase encoding matrix 400 of FIG. 4A as an example, matrix element of the phase encoding matrix 400 represents a phase state applied to a given emitter at a given time. In the phase encoding matrix 400 of FIG. 4A, each matrix element either has a value of 0 or 1, where 0 represents a first phase state (e.g., in which a phase shifter or shifters associated with an emitter is not actively changing the phase of light emitted by the emitter) and 1 represents a second phase state (e.g., in which a phase shifter or shifters associated with an emitter is actively applying a predetermined phase shift to light emitted by the emitter). It should be appreciated that in other instances the phase encoding matrix may include three or more phase states, in which case each phase state represents a different amount of phase shift provided to light emitted from a given emitter. This may allow the phase shifter arrays described herein to provide more granularity to the phase changes generated for different measurement states.

Each row of the phase encoding matrix 400 represents the phase state of a given emitter of a launch group during different target measurement states. The phase encoding matrix 400 of FIG. 4A has sixteen rows, such that each row of the phase encoding matrix 400 may correspond to a different emitter of the plurality of emitters 304a-304p of FIG. 3. The columns of the phase encoding matrix 400 represents different target measurement states. Accordingly, the phase encoding matrix defines a plurality of measurement states. For example, the first column defines a first measurement state in which the first emitter 304a (as determined by the first row of the phase encoding matrix 400) is set to a phase state of 1, a second emitter 304b (as determined by the second row of the phase encoding matrix 400) is set to a phase state of 0, and so on. When the measurement state is changed to the measurement state of column 2, the first emitter 304a continues to have a phase state of 1, the second emitter is switched from the phase state of 0 to a phase state of 1, and so on. Accordingly, each element within the phase encoding matrix 400 represents that phase of a particular emitter during a particular measurement state.

During a given measurement, the phase encoding matrix 400 may be used to change a plurality of emitters through different measurement states. Fifteen different measurement states are depicted in the example phase encoding matrix 400 of FIG. 4A, though it should be appreciated that the phase encoding matrix 400 may have a different number of measurement states (for example, the phase encoding matrix 402 of FIG. 4B has sixteen different measurement states). The plurality of emitters 304a-304p may emit light at each of these fifteen measurement states during a single measurement, which may result in incoherent addition of the contributions of the different emitters 304a-304p (and thereby provide despeckling of the output signals of the measurement as described herein).

In some variations, the plurality of emitters 304a-304p may repeatedly cycle through the plurality of target measurement states multiple times during the course of a given measurement. In these instances, the driver 318 may control the phase shifter array 308 to sequentially change the launch group between each target measurement state of the plurality of target measurement states defined by the phase encoding matrix 400, such that the launch group emits light at each target measurement state (e.g., emitted at a first target measurement state during a first period of time, emitted at a second measurement state at a second period of time subsequent to the first period of time, and so on). Once the light has been emitted by the launch group at each measurement state defined by the phase encoding matrix 400, the driver 318 may perform a second iteration in which the driver 318 controls the phase shifter array 308 to again sequentially change the launch group between each of the plurality of target measurement states defined by the phase encoding matrix 400. This may be repeated continuously for the duration of the measurement. In some variations, different iterations may change the order in which the launch group is changed between the plurality of target measurement states defined by the phase encoding matrix 400. Accordingly, in some variations, during a given measurement, the launch group (and thereby the plurality of emitters) only emit light at measurement states having a common phase state distribution.

Different selections of values within a phase encoding matrix may provide different levels of despeckling. Accordingly, some phase encoding matrices may better approximate the speckle noise reduction that may be achieved by sequentially emitting light using the plurality of emitters. For example, in instances where the phase shifter array provides a binary selection of phase state for the various emitters of a launch group, a phase encoding matrix 400 may be configured as a Hadamard matrix, in which the phase encoding matrix is a square matrix whose rows are mutually orthogonal.

In some instances, the optical measurement systems described herein may be configured to, during a measurement, change the measurement state of a launch group between a plurality of target measurement states having a common phase state distribution, which may provide load-balancing while simultaneously reducing speckle noise. Additionally, the plurality of different measurement states is configured such that every measurement state has a common phase state distribution. When the phase state distribution is the same across a plurality of measurement states, the phase shifter array may use the same amount of power across these measurement states (though it should be appreciated that in practice, there may be minor, temporary fluctuations as individual phase shifters are controlled to change the phase states of a given emitter). Accordingly, the phase shifter array may present a balanced load to a power supply that powers the phase shifter array. Because the power supply does not need to account for power fluctuations that would occur when switching between measurement states having different phase state distributions, the optical measurement system may quickly switch between different target measurement states. This may relax the requirements of the design of the optical system, such as by allowing the power supply to be positioned further away from the phase shifter array, and may reduce the overall power consumed by the phase shifter array during operation.

Both of the phase encoding matrices 400 and 402 of FIGS. 4A and 4B are load-balanced matrices in which every measurement state has a common phase state distribution. For example, FIG. 4A depicts a 16×15 phase encoding matrix 400 for a launch group with 16 emitters (represented by the 16 rows of the phase encoding matrix 400). As discussed herein, each of the fifteen measurement states (represented by the fifteen columns of the phase encoding matrix 400) has the same phase state distribution (i.e., each measurement state has eight emitters that are set at a 0 phase state and eight emitters that are set at a 1 phase state). The 16×15 phase encoding matrix 400 of FIG. 4A is a 16×16 Hadamard matrix in which one column, specifically a column in which every row has the same phase state, has been removed to generate a 16×15 matrix.

Similarly, the phase encoding matrix 402 of FIG. 4B is a 16×16 matrix for a launch group with 16 emitters (represented by the 16 rows of the phase encoding matrix 402). In this variation, each of the 16 measurement states (represented by the 16 columns of the phase encoding matrix 402) has the same phase state distribution (i.e., each measurement state has six emitters that are set to a 1 phase state and ten emitters that are set to a 0 phase state). In some of these instances, the phase encoding matrix 402 may be derived from the tensor product of a cyclic 4×4 Hadamard matrix with itself. While the embodiments of the phase encoding matrices 400 and 402 of FIGS. 4A and 4B both utilize a binary selection of phase states within each measurement state, it should be appreciated that a phase encoding matrix may still be load-balanced with three or more phase states in each measurement state. In these instances, different measurement states will still have the same phase state distribution (e.g., each measurement state will have the same number of emitters set to a first phase state, the same number of emitters set to a second phase state, the same number of emitters set to a third phase state, and so on).

Figure 5A:
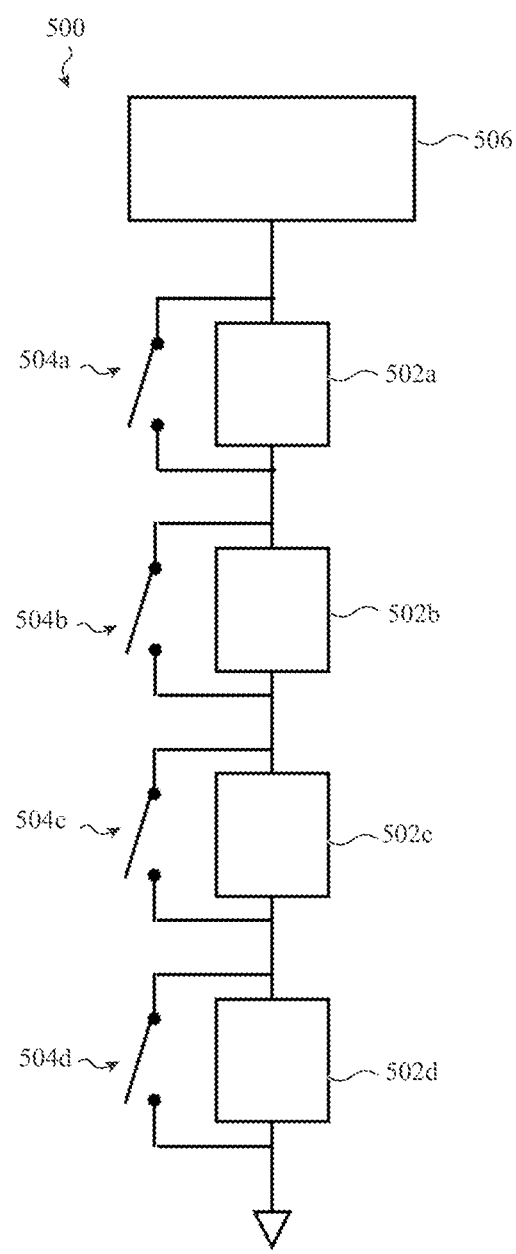
FIGS. 5A and 5B show schematic diagrams of drivers used to control a phase shifter array as described herein.

The use of load-balanced phase encoding matrices with a binary selection of phase states may allow for the use of streamlined, power-efficient drivers to control a phase shifter array as described herein. For example, FIG. 5A shows on variation of a driver 500 that may be used to control a phase shifter array as described herein. As shown there, the driver 500 controls the operation of a plurality of phase shifters 502a-502d of a phase shifter array. While four phase shifters 502a-502d are shown in FIG. 5A, it should be appreciated that the driver 500 may be used to control any number of phase shifters (e.g., the sixteen phase shifters 310 shown in FIG. 3).

The driver 500 includes a plurality switches 504a-504d that define a plurality of switch-shifter pairs. Each switch-shifter pair is formed from a phase shifter of the plurality of phase shifters 502a-502d and a switch of the plurality of switches 504a-504d connected in parallel with the phase shifter. For example, four switch-shifter pairs are shown in FIG. 5A (i.e., a first phase shifter 502a and a first switch 504a are connected in parallel to form a first switch-shifter pair, a second phase shifter 502b and a second switch 504b are connected in parallel to form a second switch-shifter pair, a third phase shifter 502c and a third switch 504c are connected in parallel to form a third switch-shifter pair, and a fourth phase shifter 502d and a fourth switch 504d are connected in parallel to form a fourth switch-shifter pair). The plurality of switch-shifter pairs is connected in series to a power supply 506 of the optical measurement system.

Each switch-shifter pair is configured to set a phase state for a corresponding emitter of a launch group as described herein. Specifically, the switch of a given switch-shifter pair (e.g., first switch 504a) may be turned off such that current provided by the power supply 506 pass through the phase shifter of the switch-shifter pair (e.g., the first phase shifter 502a). This current drives the phase shifter to change the phase of light emitted by its corresponding emitter, and thereby sets a first phase state of the emitter. Conversely, the switch of the switch-shifter pair may be turned on such that current bypasses the phase shifter of the switch-shifter pair. In these instances, the phase shifter is effectively turned off and does not impart a phase change on light emitted by the corresponding emitter, thereby setting a second phase state of the emitter.

Overall, the driver 518 may selectively control the plurality of switches to set a desired measurement state. When the driver 518 is used to set a plurality of measurement states having a common phase state distribution, the same number of switches will be on (and thereby the same number of switches will be off) for each of these measurement states. Accordingly, a constant number of phase shifters will be drawing current from the power supply 506 even as the measurement state changes. Assuming each phase shifter draws the same amount of current, the power supply 506 will see the same load as the driver 518 switches between the measurement states.

Figure 5B:
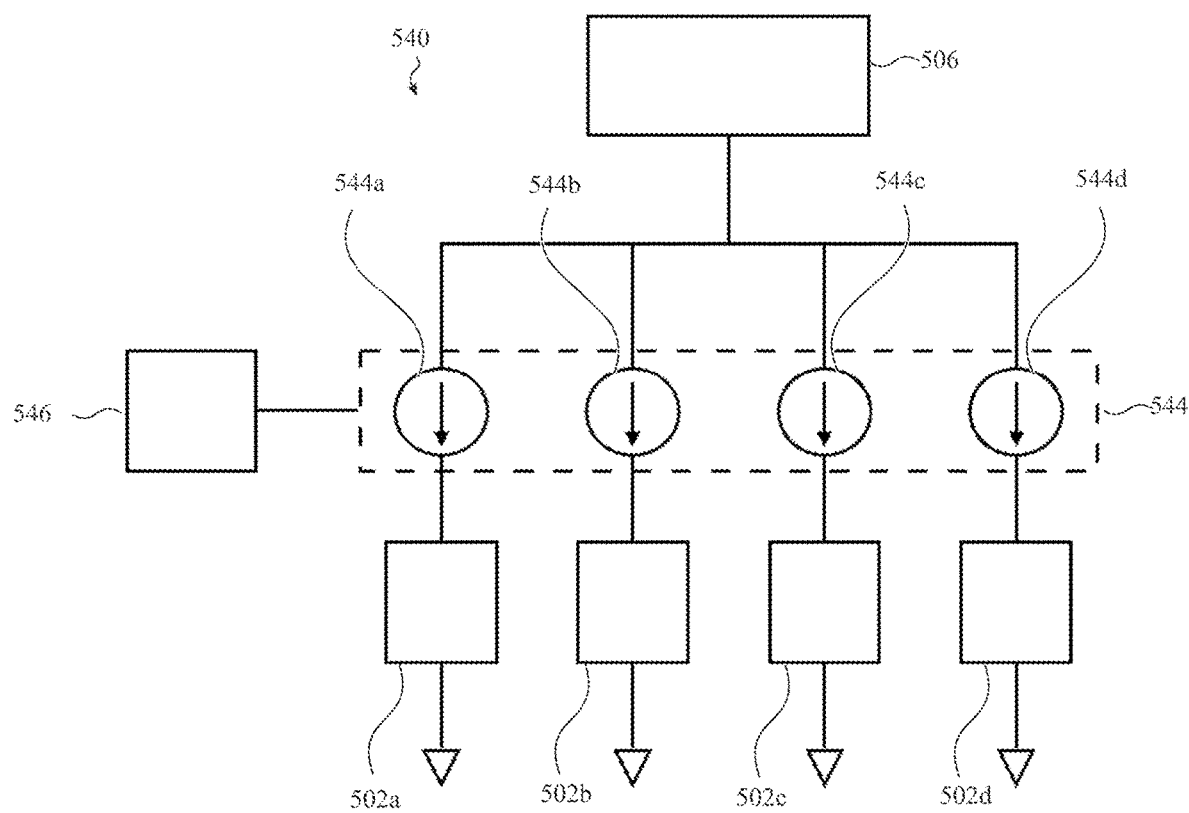

FIG. 5B shows another variation of a driver 540 that may be used to control a phase shifter array as described herein. The driver 540 controls the operation of a plurality of phase shifters 502a-502d of a phase shifter array. As with the driver 500 of FIG. 5A, four phase shifters 502a-502d are shown in FIG. 5A, though it should be appreciated that the driver 540 may be used to control any number of phase shifters such as described herein.

The driver 540 includes a current source array 544 that includes a plurality of controllable current sources 544a-544d. For each of the plurality of phase shifters 502a-502d of the phase shifter array, the driver 540 includes a controllable current source connected in series with the phase shifter. For example, the current source array 544 shown in FIG. 5B includes a first controllable current source 544a connected in series with the first phase shifter 502a, a second controllable current source 544b connected in series with the second phase shifter 502b, a third controllable current source 544c connected in series with the third phase shifter 502c, and a fourth controllable current source 544d connected in series with the fourth phase shifter 502d. The controllable current sources 544a-544d of the current source array 544 are connected in parallel to a power supply 506 of the optical measurement system.

Each controllable current source may be turned on or off to selectively activate its corresponding phase shifter. For example, the first controllable current source 544a may be turned on such that current is driven through the first phase shifter 502a. This current drives the first phase shifter 502a to change the phase of light emitted by its corresponding emitter, and thereby sets a first phase state of the emitter. Conversely the first controllable current source 544a may be turned off such that current is not driven to the first phase shifter 502a. In these instances, the phase shifter 502a does not impart a phase change on light emitted by the corresponding emitter, thereby setting a second phase state of the corresponding emitter.

The driver 540 may include a state decoder 546 that selectively controls the controllable current sources 544a-554d of the current source array 544 to set a desired measurement state of a launch group. When the driver 540 is used to set a plurality of measurement states having a common phase state distribution, the same number of controllable current sources will be on (and thereby the same number of controllable current sources will be off) for each of these measurement states. Accordingly, a constant number of phase shifters will be drawing current from the power supply 506 even as the measurement state changes. Assuming each phase shifter draws the same amount of current, the power supply 506 will see the same load as the driver 540 switches between the measurement states.

In some instance of the optical measurement systems described herein, it may be desirable to change the phase state distribution at one or more points within a given measurement. In these instances, the optical measurement systems may divide a measurement into a plurality of measurement stages. Each of the plurality of measurement stages is associated with a corresponding phase state distribution, and during each measurement stage the optical measurement system will switch between measurement states having the corresponding phase state distribution. In other words, the measurement states within each measurement stage have a common phase state distribution, and different measurement stages may have different common phase state distributions. The optical measurement system may perform one or more measurement sequences as part of the measurement sequence, in which the measurement sequence includes each of the measurement stages. By grouping measurement states in this way, the overall measurement may see improved noise reduction and/or reduced power consumption while reducing the frequency of load changes caused by changing the phase state distribution between successive measurement states.

Figure 6A:
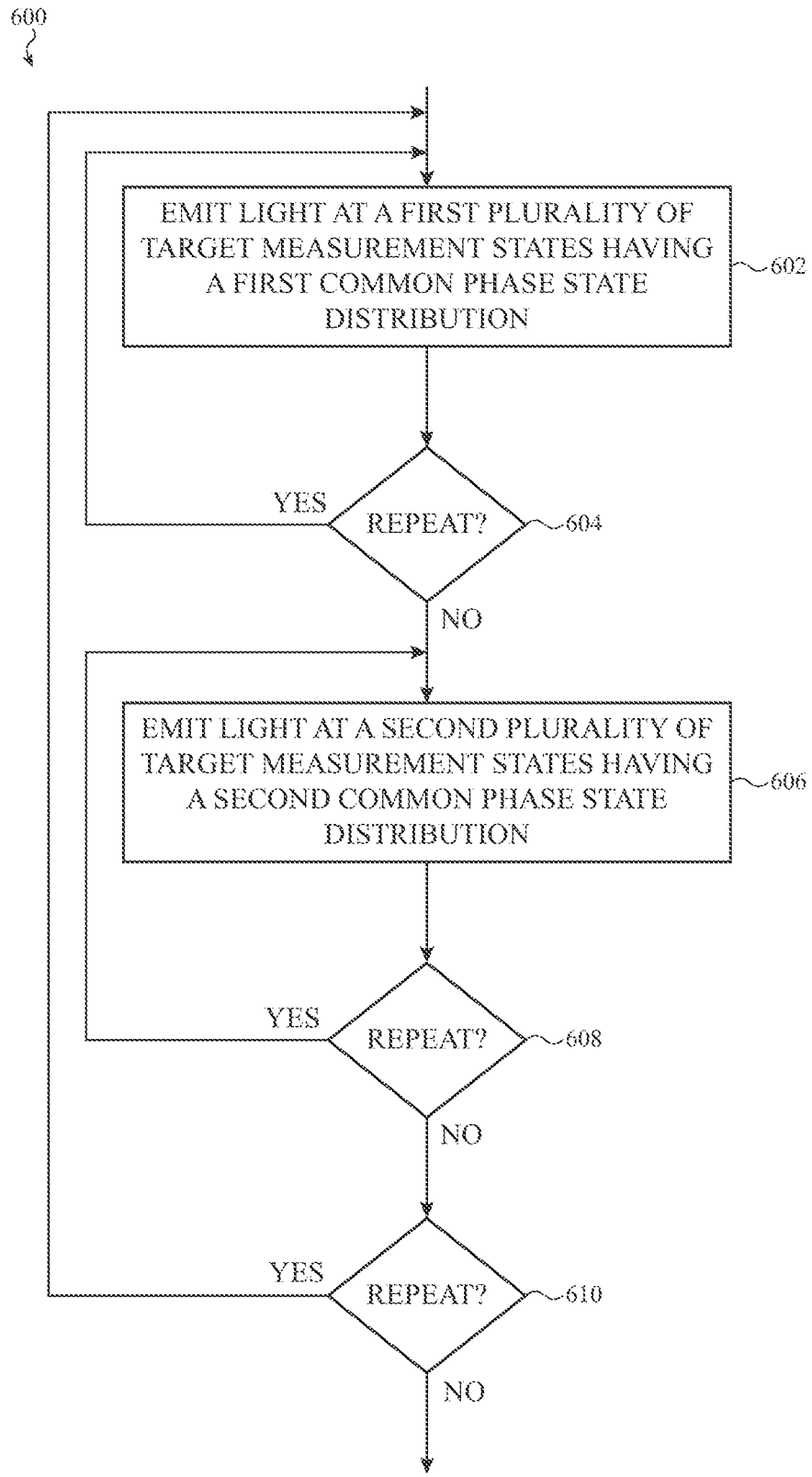
FIG. 6A shows a method of performing a measurement as described herein.

For example, FIG. 6A shows a method 600 of performing a measurement using multiple measurement stages, each of which has a different common phase state distribution. Specifically, an optical measurement system may perform a measurement sequence in which a first portion of the measurement is performed during a first measurement stage and a second portion of the measurement is performed during a second measurement stage. Performing the measurement during the first measurement stage includes emitting light at a first plurality of target measurement states having a first common phase state distribution at step 602. In other words, a launch group of the optical system will only emit light having the first common phase state distribution during the first measurement stage.

Using the optical measurement system 300 of FIG. 3 as an example, the launch group 302 may be controlled during the first measurement stage (e.g., by controlling the light generation assembly 306 with the controller 316) to simultaneously generate light from each of the plurality of emitters 304a-304p. While the plurality of emitters 304a-304p is simultaneously emitting light, the measurement state of the launch group may be changed between the first plurality of target measurement states. A detector group (such as one of the detector groups 206a-206 of FIG. 2) may measure return light (i.e., light that enters the optical measurement system) that is received while the launch group emits light. The set of output signals generated by the detector during this measurement may, by virtue of the change in measurement states over the course of the measurement, average out some of the speckle noise and increase the SNR of the set of output signals during the first measurement stage.

In some variations, the plurality of emitters 304a-304p may repeatedly cycle through the first plurality of target measurement states multiple times during the course of the first measurement stage. Specially, at step 604, the method may repeat step 602 one or more times. In these instances, the driver 318 may perform a first iteration in which the driver 318 controls the phase shifter array 308 to sequentially change the launch group between each target measurement state of the first plurality of target measurement states, such that the launch group emits light at each target measurement state (e.g., emitted at a first target measurement state of the first plurality of target measurement states during a first period of time, emitted at a second measurement state of the first plurality of target measurement states during a second period of time subsequent to the first period of time, and so on). The driver 318 may then perform a second iteration in which the driver 318 controls the phase shifter array 308 to change the launch group again sequentially between each of the first plurality of target measurement states. This may be repeated continuously for multiple iterations (e.g., for a set number of iterations or continuously for a first period of time corresponding to the first measurement stage). In some variations, different iterations within the first measurement stage may change the order in which the launch group is changed between the first plurality of target measurement states.

Following the completion of the first measurement stage, the optical measurement system may perform a second portion of the measurement during a second measurement stage. Specifically, performing the measurement during the second measurement stage includes emitting light at a second plurality of target measurement states having a second common phase state distribution (different than the first common phase state distribution) at step 606. In other words, a launch group of the optical system will only emit light having the second common phase state distribution during the second measurement stage. Because each measurement stage utilizes a single corresponding phase state distribution, each of these portions of the measurement is load-balanced, such that the only load changes occur at the transition between measurement stages.

The launch group 302 may be controlled during the second measurement stage (e.g., by controlling the light generation assembly 306 with the controller 316) to simultaneously generate light from each of the plurality of emitters 304a-304p. While the plurality of emitters 304a-304p is simultaneously emitting light, the measurement state of the launch group may be changed between the second plurality of target measurement states. The detector group may measure return light that is received while the launch group emits light. The set of output signals generated by the detector during this measurement may, by virtue of the change in measurement states over the course of the measurement, average out some of the speckle noise and increase the SNR of the set of output signals during the second measurement stage. Accordingly, the different measurement stages collectively contribute to the reduction of speckle noise in the overall measurement.

In some variations, the plurality of emitters 304a-304p may repeatedly cycle through the second plurality of target measurement states multiple times during the course of the second measurement stage. Specially, at step 608, the method may repeat step 606 one or more times. In these instances, the driver 318 may perform a first iteration in which the driver 318 controls the phase shifter array 308 to sequentially change the launch group between each target measurement state of the second plurality of target measurement states, such that the launch group emits light at each target measurement state (e.g., emitted at a first target measurement state of the second plurality of target measurement states during a first period of time, emitted at a second measurement state at of the second plurality of target measurement states during a second period of time subsequent to the first period of time, and so on). The driver 318 may then perform a second iteration in which the driver 318 controls the phase shifter array 308 to change the launch group again sequentially between each of the second plurality of target measurement sites. This may be repeated continuously for multiple iterations (e.g., for a set number of iterations or continuously for a second period of time corresponding to the second measurement stage). In some variations, different iterations within the second measurement stage may change the order in which the launch group is changed between the second plurality of target measurement states. While shown in FIG. 6A as including two different measurement stages associated with two different phase state distributions, it should be appreciated that principles of the method 600 may be extended to include additional measurement stages associated with additional different phase state distributions.

In some instances, the method may cycle through the various measurement stages. For example, at step 610 the method 600 may repeat the sequence of the first and second measurement stages. In this way, the method 600 may alternate between the different phase state distributions as may be desired over the course of the measurement. In instances where the measurement is divided into three or more measurement stages, the optical system may optionally change the order in which each measurement stage is performed between different iterations of the sequence of measurement stages.

Figure 6B:
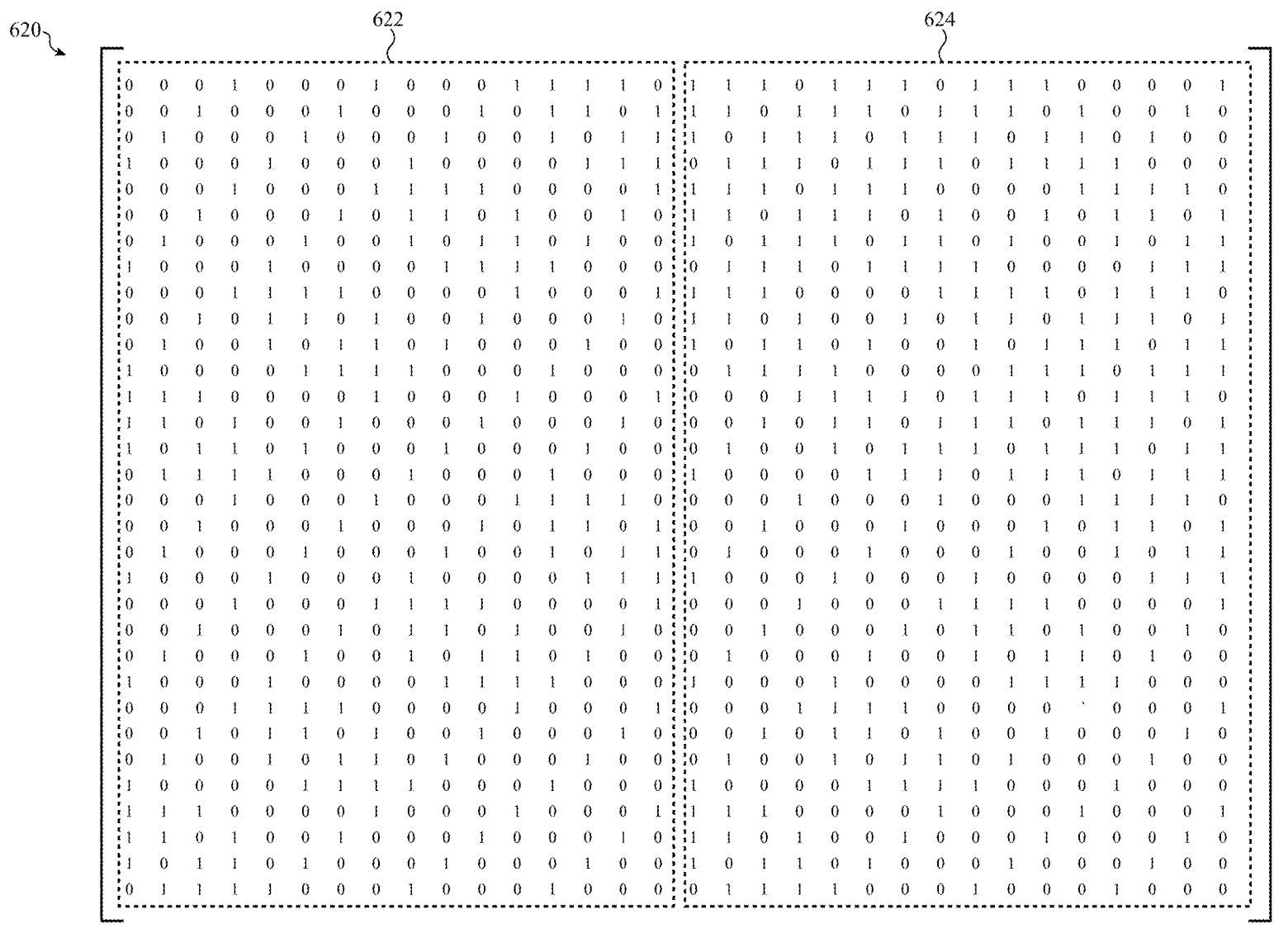

The driver 318 may utilize one or more phase encoding matrices (which may be received from the controller 316) to set a measurement state of the launch group 302 at each point in time within the measurement. For example, FIG. 6B shows an example of a phase encoding matrix 620 that may be used to control a launch group having 32 emitters (represented by the rows of the phase encoding matrix 620). Specifically, the phase encoding matrix 620 is a 32×32 matrix that includes a first plurality of target measurement states 622 (represented by the first 16 columns of the phase encoding matrix 620) and a second plurality of target measurement states 624 (represented by the second 16 columns of the phase encoding matrix 620). The first plurality of target measurement states 622 has a first common phase state distribution of distribution (i.e., each measurement state has twelve emitters that are set to a 1 phase state and twenty emitters that are set to a 0 phase state) and the second plurality of target measurement states 624 has a second common phase state distribution of distribution (i.e., each measurement state has 16 emitters that are set to a 1 phase state and 16 emitters that are set to a 0 phase state). In some of these instances, the phase encoding matrix 620 may be derived from the Kroneker tensor product of a cyclic 2×2 Hadamard matrix with the phase encoding matrix 402 of FIG. 4B.

In an example of the method 600 of FIG. 6A, the driver 318 may utilize the first plurality of target measurement states 622 during the first measurement stage and may utilize the second plurality of target measurement states 624 during the second measurement stage. It should be appreciated that the different pluralities of target measurement sites may be separated into different matrices for use by the driver 318 during the respective measurement stages. Assuming that the measurement uses equal durations between the first and second measurement stages, the average number of phase shifters on at a time is fourteen, which may be smaller than a Hadamard sequence for a similarly sized matrix. As a result, the phase encoding matrix 620 of FIG. 6B may provide noise reduction while consuming less overall power as compared to other approaches.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An optical measurement system comprising:
   a light generation assembly comprising a light source unit that is configured to generate light;
   a photonic integrated circuit comprising a launch group, the launch group comprising a plurality of emitters optically coupled to the light generation assembly to receive light generated by the light generation assembly;
   a detector group; and
   a controller configured to perform a measurement using the light generation assembly, the launch group, and the detector group, wherein the measurement comprises:
   generating light using the light source unit;
   simultaneously emitting the generated light from each of the plurality of emitters such that the plurality of emitters emits light at a corresponding set of phase states defined by a measurement state;
   changing, during the simultaneous emission of the generated light, the measurement state between a plurality of target measurement states having a common phase state distribution;
   measuring, using the detector group, return light received during the simultaneous emission of the generated lighted light, wherein:
   during the measurement, the plurality of emitters only emits light at measurement states having the common phase state distribution.

2. The optical measurement system of claim 1, wherein:
   the launch group is a first launch group;
   the photonic integrated circuit comprises a plurality of launch groups that includes the first launch group, such that each launch group of the plurality of launch groups is optically coupled to the light generation assembly to receive light generated by the light generation assembly;
   the detector group is a first detector group; and
   the optical measurement system comprises a plurality of detector groups that includes the first detector group.

3. The optical measurement system of claim 2, wherein:
   the measurement is a first measurement;
   the plurality of launch groups comprises a second launch group;
   the plurality of detector groups comprises a second detector group; and
   the controller is configured to perform a second measurement using the light generation assembly, the second launch group, and the second detector group.

4. The optical measurement system of claim 3, wherein:
   the controller is configured to perform the first measurement concurrently with the second measurement.

5. The optical measurement system of claim 4, wherein:
   the photonic integrated circuit comprises a phase shifter array having a plurality of phase shifters;
   each phase shifter of the plurality of phase shifters is controllable to change a phase state of light emitted by a corresponding emitter of the plurality of emitters; and
   the controller is configured to, during the measurement, control the phase shifter array to adjust the relative phase states of the plurality of emitters such that plurality of emitters emits light at the corresponding set of phase states for each of the plurality of target measurement states.

6. The optical measurement system of claim 5, comprising:
   a driver configured to control the phase state of each phase shifter of the plurality of phase shifters.

7. The optical measurement system of claim 6, wherein:
the driver comprises a plurality of switch-shifter pairs connected in series to a power supply; and
each switch-shifter pair of the plurality of switch-shifter pairs comprises:
a corresponding phase shifter of the plurality of phase shifters; and
a switch connected in parallel to the corresponding phase shifter of the plurality of phase shifters.

8. The optical measurement system of claim 6, wherein:
the driver comprises a plurality of controllable current sources connected in parallel to a power supply; and
each controllable current source of the controllable current source is connected in series to a corresponding phase shifter of the plurality of phase shifters.

9. The optical measurement system of claim 1, wherein:
the light generation assembly comprises a switch network that optically couples the light source unit to the plurality of emitters.

10. The optical measurement system of claim 1, further comprising:
an interposer, wherein:
the photonic integrated circuit and the plurality of detector groups are mounted on the interposer.

11. The optical measurement system of claim 1, wherein:
each phase state of plurality of the target measurement states is selected from a binary pair of candidate phase states.

12. An optical measurement system comprising:
a light generation assembly comprising a light source unit that is configured to generate light;
a photonic integrated circuit comprising a launch group and a phase shifter array; and
a controller, wherein:
the launch group comprises a plurality of emitters;
each emitter of the plurality of emitters is optically coupled to the light generation assembly to receive light generated by the light generation assembly and emit a corresponding beam of light;
the phase shifter array comprises a plurality of phase shifters;
each phase shifter of the plurality of phase shifters is controllable to set a phase state of the beam of light emitted by a corresponding emitter of the plurality of emitters; and
the controller is configured to:
control the light generation assembly to generate light such that the plurality of emitters simultaneously emits light from the photonic integrated circuit; and
control, while the plurality of emitters simultaneously emits light, the phase shifter array to repeatedly cycle a measurement state of the plurality of emitters between a plurality of target measurement states; wherein:
each of the plurality of target measurements states has a common phase state distribution.

13. The optical measurement system of claim 12, comprising:
a detector group, wherein the controller is configured to measure, using the detector group, return light received while the plurality of emitters simultaneously emits light.

14. The optical measurement system of claim 13, further comprising:
an interposer, wherein:
the photonic integrated circuit and the plurality of detector groups are mounted on the interposer.

15. The optical measurement system of claim 12, comprising:
a driver configured to control the phase state of each phase shifter of the plurality of phase shifters.

16. The optical measurement system of claim 15, wherein:
a driver controls the phase state of each phase shifter of the plurality of phase shifters based on a phase encoding matrix.

17. The optical measurement system of claim 15, wherein:
the driver comprises a plurality of switch-shifter pairs connected in series to a power supply; and
each switch-shifter pair of the plurality of switch-shifter pairs comprises:
a corresponding phase shifter of the plurality of phase shifters; and
a switch connected in parallel to the corresponding phase shifter of the plurality of phase shifters.

18. The optical measurement system of claim 15, wherein:
the driver comprises a plurality of controllable current sources connected in parallel to a power supply; and
each controllable current source of the controllable current source is connected in series to a corresponding phase shifter of the plurality of phase shifters.

19. The optical measurement system of claim 12, wherein:
the light generation assembly comprises a switch network that optically couples the light source unit to the plurality of emitters.

20. The optical measurement system of claim 12, wherein:
each phase state of plurality of the target measurement states is selected from a binary pair of candidate phase states.

21. The optical measurement system of claim 12, wherein:
the plurality of target measurement states is a first plurality of target measurement states;
the common phase state distribution is a first common phase state distribution;
the controller is configured to control, while the plurality of emitters simultaneously emits light, the phase shifter array to repeatedly cycle a measurement state of the plurality of emitters between a second plurality of target measurement states; and
the second plurality of target measurement states has a second common phase state distribution different than the first phase state distribution.

22. A method of performing a measurement using an optical measurement system, the method comprising:
simultaneously emitting light from a plurality of emitters of a launch group of a photonic integrated circuit; and
performing a measurement sequence comprising a first measurement stage and a second measurement stage, wherein:
performing the first measurement stage comprises:
controlling, while the plurality of emitters simultaneously emits light, a phase shifter array to perform at least one first iteration in which a measurement state of the plurality of emitters is changed between a first plurality of target measurement states having a first common phase state distribution; and measuring, using a detector group, return light received during the at least one first iteration; and performing the second measurement stage comprises:

controlling, while the plurality of emitters simultaneously emits light, the phase shifter array to perform at least one second iteration in which the measurement state of the plurality of emitters is changed between a second plurality of target measurement states having a second common phase state distribution that is different than the first common phase state distribution; and measuring, using the detector group, return light received during the at least one second iteration.

23. The method of claim 22, wherein:
performing the first measurement stage comprises performing multiple first iterations.

24. The method of claim 22, wherein:
performing the second measurement stage comprises performing multiple second iterations.

25. The method of claim 22, comprising:
repeating the measurement sequence.

26. The method of claim 25, wherein:
repeating the measurement sequence comprises changing an order of the first measurement stage and the second measurement stage.

* * * * *